July 2, 1963  C. M. SWAN  3,096,014
PRINTABLE SHEET AND METHOD
Filed Nov. 7, 1960  2 Sheets-Sheet 2
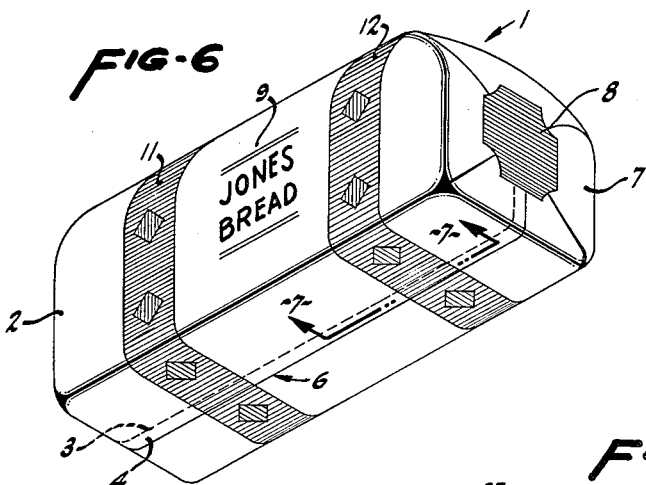
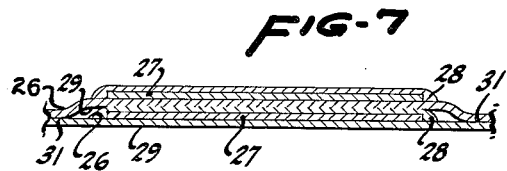
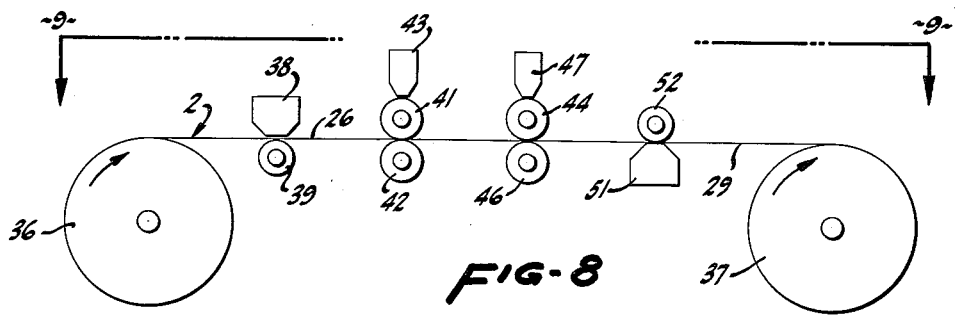
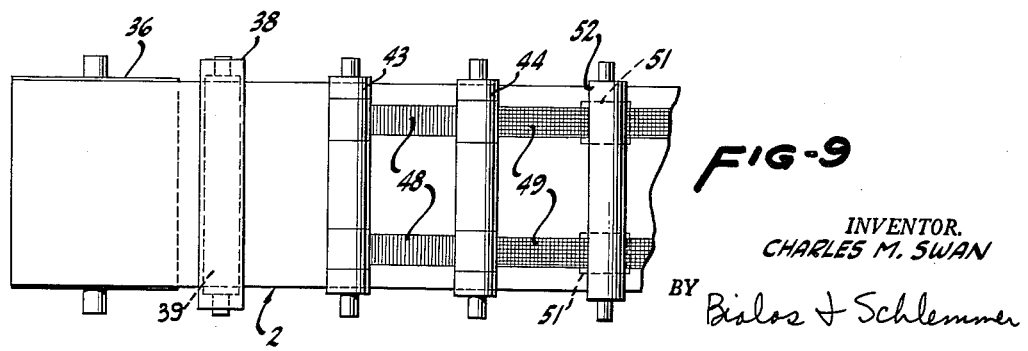
INVENTOR.
CHARLES M. SWAN
BY Bialos & Schlemmer
ATTORNEYS

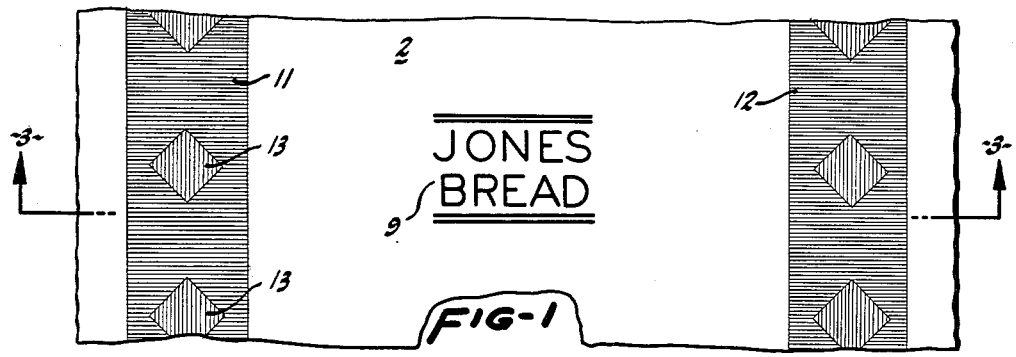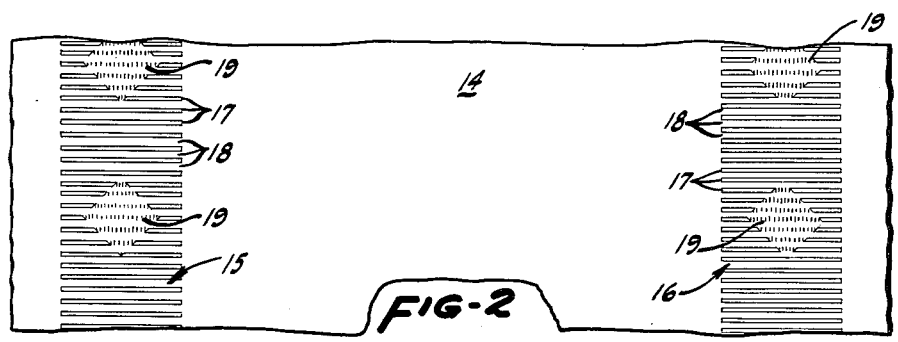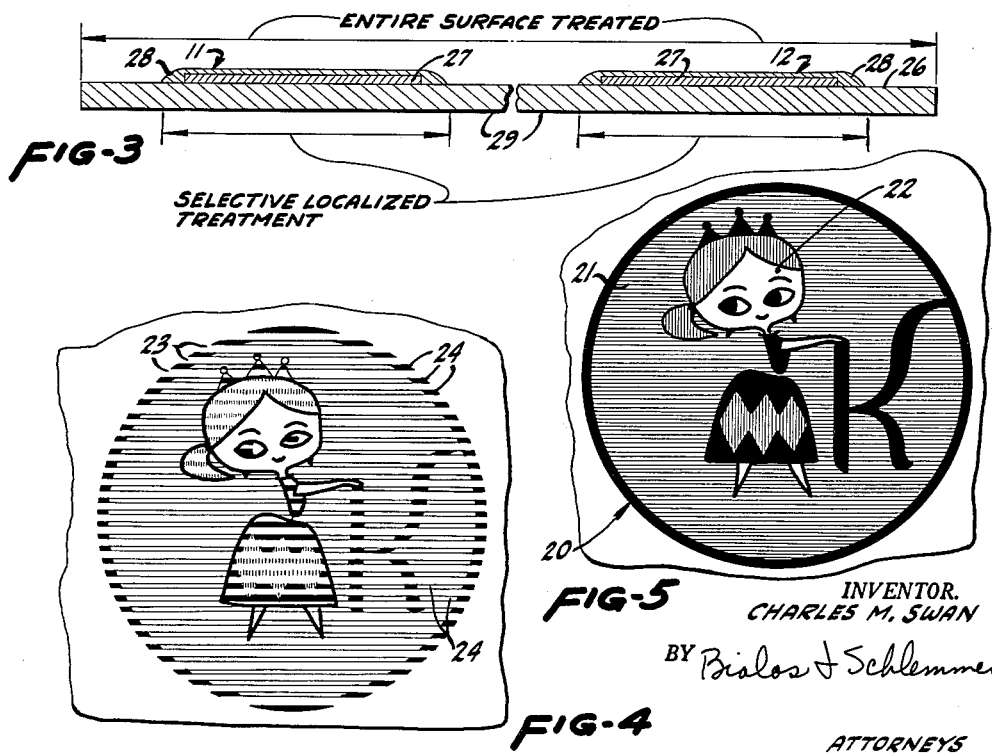

United States Patent Office 3,096,014
Patented July 2, 1963

3,096,014
PRINTABLE SHEET AND METHOD
Charles M. Swan, San Lorenzo, Calif., assignor to Crown Zellerbach Corporation, San Francisco, Calif., a corporation of Nevada
Filed Nov. 7, 1960, Ser. No. 67,707
11 Claims. (Cl. 229—87)

This invention relates generally to a printable sheet and method, and more particularly to a heat sealable thermoplastic sheet or film and a method of rendering the same receptive to the application of printing inks thereto and to the enhancement of the heat sealing characteristics thereof. That is, the invention relates to an article wrapping sheet which is heat sealable in all areas thereof and on which printed descriptive or advertising or decorative indicia having a solid inked background may be provided, such sheet being heat sealable directly across such solid printed indicia when the sheet is folded to surround the article being wrapped. The invention is particularly well suited for use in the packaging of bread and other perishable edibles but is equally well adapted for the wrapping and packaging of various other articles for which a protective or decorative covering is desired.

Accordingly, objects of the present invention include the provision of a printable wrapping sheet desirably comprised of a thermoplastic heat sealable film which is heat sealable in all its areas including those areas which have been printed with decorative or descriptive or advertising indicia; the provision of a wrapping sheet which has been treated to make the same receptive to printing; the provision of a sheet in which normally non-heat sealable printed areas have been over-coated with a heat sealing medium to render such areas heat sealable to another sheet surface; the provision of such an over-coated sheet the opposite surface of which has been selectively treated to be heat sealably compatible with the over-coated areas; and to the provision of a method for rendering a heat sealable sheet ink receptive and for enhancing the heat sealing characteristics thereof so that the sheet when printed is heat sealable in all areas thereof. These and other objects will become apparent from a study of the following specification.

Within recent years the use of thermoplastic resinous sheets or films, such as polyethylene and like heat sealable films, have become popular for the wrapping of various articles, and such films have particular adaptability for the wrapping of bread in that such films are transparent, have a desirable "feel" to the prospective purchaser and may be heat sealed on automatic machinery so that the wrapping operation may be rapidly and easily effected. However, such thermoplastic films in the untreated state are generally non-receptive to the application of printing inks thereto so that heretofore substantial difficulty has been encountered in applying decorative, advertising, or identifying indicia to the films by means of which the wrapped articles packaged therein could be identified as to manufacturing source and the like.

While heretofore it has been known that such films may be made receptive to the application of printing inks thereto by one of several well known surface treatments, such as electrical bombardment, flame treatment, or chemical treatment such as chlorination, the difficult problem of providing strong heat sealed seams over the printed areas of the films has persisted. That is, although surface treatment of polyethylene and like films to make the same receptive to printing inks is well known, as illustrated by the patents to Rothacker 2,802,085, Kritchner, 2,648,097 and Wolsinski 2,715,075, and many others, presently available printing inks which are suitable for use on thermoplastic films after surface treatment are not in and of themselves heat sealable. As a result, heretofore when printed areas of a sheet fell within an overlapped seam to be heat sealed, undesirable heat seal results occurred in the form of weak and incomplete heat seal bonds.

Heretofore, it has been necessary to leave substantially large and unsightly unprinted spaces within the boundaries of the inked areas so that such unprinted spaces could be employed in bringing about at least a partial heat seal between overlapped surfaces which have inked areas thereon. That is, heretofore, it has not been possible to have a solid printed background in the inked areas in that such a solid background would preclude heat sealing of two sheet surfaces to each other within the boundaries of the inked areas.

Other attempts to solve the problem have been made by applying no printing to the sheets and instead by inserting a printed wax paper band or the like within the package so as to be visible through the wrapping sheet. Such procedure is undesirable because it requires special machinery and entails additional expense.

With the present invention however, a heat sealable sheet is provided which is receptive to printing inks and with which solid printed areas completely covered with printing inks may be employed and in which solid printed areas are rendered heat sealable so that the sheet is heat sealable in all areas thereof, printed or unprinted. As a result, two surfaces of a sheet may be overlapped with a printed area falling within the overlapped seam thus provided and such seam may be heat sealed along its length directly over and throughout the full extent of the printed area. With a sheet of the subject invention, it is no longer necessary to leave substantially large unprinted spaces within the boundaries of the printed areas to permit heat sealing within the printed areas. Nor are separate bands within the package necessary. As a result, solid inked areas of advertising, decorative, or article identifying indicia may be applied over large portions of the wrapping sheet without detracting from the heat sealing capabilities of the sheet.

For an understanding of the subject invention, reference is directed to the accompanying drawings.

FIG. 1 is a plan view of a printed heat sealable sheet of the subject invention.

FIG. 2 is a plan view of a printed heat sealable sheet of the type heretofore employed.

FIG. 3 is a sectional view through the sheet of this invention on an enlarged and exaggerated scale taken in the plane of line 3—3 of FIG. 1.

FIGS. 4 and 5 are partial plan views showing decorative and article identifying indicia applied respectively to a heretofore employed sheet and to the sheet of the subject invention.

FIG. 6 is an isometric view of a loaf of bread wrapped in a sheet of this invention.

FIG. 7 is a sectional view through an overlapped seam of the wrapped article on an enlarged scale taken in the plane of line 7—7 of FIG. 6.

FIG. 8 is a more or less schematic side elevational view of an apparatus for treating and printing the subject heat sealable sheet.

FIG. 9 is a plan view of the apparatus of FIG. 8 taken in the plane of line 9—9 thereof.

While hereinafter reference will be directed primarily to the resinous thermoplastic heat sealable sheet well known as polyethylene which has been found highly effective for the purposes disclosed herein, it should be understood that the present invention is equally well suited to be embodied in other heat sealable films, particularly those which are not generally receptive to well known adhesives. For example, it is contemplated that the subject invention also may be embodied in resinous heat sealable films of polypropylene, Saran marketed by the Dow Chemical Company, and other similar heat sealable films of which numerous are presently known. Accordingly, the present invention should be interpreted in light of its broader aspects even though reference is directed herein primarily to polyethylene by way of example.

As mentioned herein previously, heat sealable films such as polyethylene have taken on great importance in the packaging field, particularly for the wrapping of perishable and fresh articles such as loaves of bread. Such films are well suited for this purpose in that they are transparent, have a soft "feel," are generally impervious to air passage, and are heat sealable on automatic machinery.

As shown in FIG. 6, a wrapped package 1 is illustrated which comprises a loaf of bread surrounded and protected by a transparent printed wrapping sheet 2 of polyethylene. Generally a loaf of bread is wrapped in a single protective sheet with the margins 3 and 4 of the sheet overlapped on the underside of the loaf to define a longitudinally extending overlapped seam 6. At opposite ends of the loaf the wrapper is generally infolded as shown at 7 and a heat sealable or adhesive end label 8 is applied thereto to retain the end folds in proper position. Desirably the overlapped seam 6 is heat sealed along its length during the wrapping operation in any well known manner.

So that the respective buyer may know the producer of the article being purchased and also so that the package may be made as attractive as possible, predetermined areas of the wrapping sheet desirably are provided with printed areas of descriptive, advertising, or identifying indicia such as shown at 9, 11 and 12. Such indicia may take the form of a manufacturer's name or symbol, as at 9, or may take the form of decorative indicia, such as brightly colored bands or strips as at 11 and 12. It should be appreciated, as illustrated by FIG. 6, that when a wrapping sheet is employed to encase an article therein that portions of the printed indicia quite frequently will fall within the overlapped seam 6 extending longitudinally of the article.

Because there are presently no commercially available printing inks which are heat sealable, the presence of printed indicia in the overlapped seam to be heat sealed has heretofore presented serious problems in that attempts to heat seal over printed areas frequently resulted in ink smearing or insecure sealing. As a result, heretofore, solid printed backgrounds or indicia could not be employed and it was necessary to leave substantially large unprinted spaces within the boundaries of the printed areas so that at least a partial heat sealing could be effected within such boundaries. This procedure has proven undesirable because of the unattractive appearance presented by an intermittently printed area and the insecure seal which results.

In this latter connection, reference is directed to the comparative showings of FIGS. 1 and 2 and FIGS. 4 and 5 which illustrate the solid printed indicia employable with the sheet of the subject invention and the intermittent printed indicia employed heretofore. FIG. 1, for example, illustrates a web or sheet 2 of the subject film on which a pair of parallel printed indicia bands 11 and 12 each of which comprises a solid inked background and extends the length of the web are employed. It should be understood that the horizontal lines of the bands are intended to indicate a solid background color, such as blue, while the vertical lines within the diamonds 13 of the design are intended to illustrate a solid printed contrasting color, such as red. In comparison, however, attention is directed to the web or sheet of FIG. 2 identified as 14 in which the decorative bands or strips 15 and 16 respectively are defined by intermittent and spaced printed colored areas 17 which are separated from each other by substantially large unprinted spaces 18 within the boundaries defined by the printing. This same intermittent pattern necessarily is employed as shown at 19 within the contrastingly colored diamonds of the design. Such intermittent printed and unprinted areas heretofore were necessary so that the sheet could be heat sealed within the boundaries of the printing in an overlapped seam.

Similarly, comparing FIGS. 4 and 5 which illustrates a trademark of other similar indicia intended to identify the wrapped article's source, it should be noted that with the subject invention, FIG. 5, a solid multi-colored printed design 20 is shown which comprises a solid color background 21 upon which a multi-colored figure 22 is set out therefrom in solid contrasting colors of any desired shade and number. Contrast this with the intermittent printed pattern heretofore required with the same indicia. As shown in FIG. 4 large unprinted spaces 23 are necessary to separate printed areas 24 from each other so that heat sealing within the boundaries of the printing could be effected in an overlapped seam. Clearly comparison of FIGS. 1 and 2 and FIGS. 4 and 5 show the much less desirable appearance presented with prior art intermittent printed patterns as opposed to the solid printed patterns employable with this invention.

As mentioned hereinbefore, the making of a film such as polyethylene receptive to printing inks by electrically, chemically or flame treating the entire surface of the same has been known heretofore. This treating principle also is employed with the subject invention to modify the molecular structure of the film surface to make the same more readily heat sealable and to make the treated areas receptive to inks and the like. For economy of operation, and because at the time of film manufacture it generally is not known exactly what indicia pattern ultimately will be applied to the film during the printing operation, one entire surface is treated so that such entire surface may be printed at any predetermined location thereon. Obviously, if so desired and if the exact printing pattern to be applied to the film is known, the one surface thereof could be selectively treated in accordance with such known pattern.

After treatment of one surface 26, the desired printed indicia is applied thereto as shown at 27 in the much enlarged and exaggerated showing of FIG. 3. That is, printed indicia 27, whether the same be letters of the alphabet, designs or trademarks, or decorations of the type shown in FIGS. 1 and 6, are applied in any predetermined manner to the treated surface 26 of the film. As noted previously, no printing inks presently are known which are heat sealable without running and blurring. Accordingly, when a solid printed area is desired, it is necessary to provide a means by which the printed area may be heat sealed to another surface. For this purpose, a clear heat sealing medium 28 is applied over or coated on the inked areas as shown in FIG. 3. Such heat sealable medium desirably is a clear heat sealable lacquer of which many types are commercially available. For economy, lacquer overcoatings desirably are applied over and in line with only the printed areas of the sheet. However, because heat sealable lacquers, just as the printing inks presently available, are not readily applicable to untreated polyethylene and like films, the surface treatment mentioned previously is also desirable to render the film receptive to the overcoating layers 28 of heat sealable lacquer.

Because untreated polyethylene and like films are not generally receptive to or acceptably heat sealable with presently known heat sealable lacquers, it has been found suitable to treat the opposite or reverse side of the wrapping sheet so that the heat sealing characteristics thereof relative to the heat sealable lacquer applied to the one surface may be enhanced. That is, the reverse surface 29 of the sheet may be electrically, chemically or flame treated to make the same readily heat sealable with the heat sealable lacquer in the overlapped seams of a sheet when the same is wrapped around an article.

However, it also has been found that treated film surfaces are not readily heat sealable to other treated film surfaces and that if an attempt is made to heat seal two treated surfaces to each other, undesirable results occur, in the form of reduced heat seal strength, increased heat seal temperatures, or both. Also, it has been found that the coefficient of friction or tendency of treated surfaces to block when the same are contacted by other treated surfaces is significantly increased so that attendant problems are encountered during the printing, unrolling, or rolling operations attendant thereto.

Accordingly, undesirable features would result if the entire reverse surface 29 of the sheet were treated. Thus, because only preselected areas of surface 26 are printed and lacquered, only limited preselected areas of reverse surface 29 are treated so that when a sheet is folded upon itself, as shown in FIGS. 6 and 7, lacquer contacts treated film, and untreated film contacts treated film. In this connection, when the reverse surface 29 of a heat sealable sheet is treated to make the same heat sealable with the heat sealable lacquer, such treatment is applied only to preselected and localized areas thereof as shown in FIG. 3. Such preselected areas are aligned with and conform to the boundaries or outlines of the printed areas provided on surface 26 of the sheet which are overlain by the heat sealable layers of lacquer. In this manner, when a wrapping sheet of this invention is overlapped to provide a seam, only the selectively treated areas of the reverse sheet surface 29 will be aligned with and engaged by the heat sealable lacquer layers 28 overlying the printed areas 27 provided on the other surface 26 of the sheet. As a result, as shown at 31 in FIG. 7, in those portions of the overlapped seam lying between the printed areas 27 of the respective sheet surfaces, a treated surface 26 is directly and heat sealably engaged directly with an overlying untreated area of the sheet surface 29. As a result, a secure heat sealable bond is effected throughout the length of the seam, irrespective of whether solid printed areas fall within the seam.

While various arrangements may be employed for carrying out the rendering of a sheet receptive to printing inks and heat sealable lacquers and for making such a sheet heat sealable throughout its full extent, attention is directed to FIGS. 8 and 9 of the drawings which illustrate generally schematically apparatus which is employable for this purpose.

As shown in such figures, web 2 of suitable heat sealable film may be withdrawn from a supply roll 36 and rewound on a take-up roll 37 in any well known manner after treatment and printing. While in the embodiment illustrated, a treating procedure is illustrated in conjunction with a web that has previously been manufactured by extruding or the like and which then has been wound on the supply roll, it should be understood that one or all of the steps may be carried out immediately following the manufacturing or extruding operation if so desired. In fact, if slip additives have been inserted in the resin, it has been found desirable to surface treat the film promptly after extrusion in that such additives tend to migrate to the film surface and to make subsequent treatment more difficult and less effective.

While as noted previously, a surface treatment of the entire surface 26 may be effected in any suitable manner, in the embodiment illustrated desirably an electrical bombardment procedure is employed which includes passing a web of predetermined width beneath and in close proximity to (i.e. 1/16 to 1/8 inch) an elongated electrode encased in a suitable housing 38, and over an electrically grounded roll 39 positioned therebeneath to support the web at a first station. Such surface treatment will render the entire upper surface 26 of the web receptive to printing inks and the heat sealable lacquer mentioned previously. Following such surface treatment the web is carried to a second station and passed between a printing roll 41 and back-up roll 42 at which location the desired indicia is printed onto the web. In this connection, for purposes of illustration, the parallel band indicia discussed previously is shown being applied to the web. Any suitable ink source, such as a reservoir 43, may be employed for supplying ink to printing roll 41.

Following the ink application, the web is carried to a third station and moved between a lacquer applying roll 44 and a back-up roll 46, at which station the layers of lacquer are applied over the previously printed areas. For this purpose a lacquer reservoir 47 also may be provided.

As shown in FIG. 9, with the illustrative example shown, a pair of parallel decorative bands of the type shown in FIG. 1 are applied with the inked bands being shown at 48 and the overcoated lacquer bands being shown at 49.

Selective treatment of the reverse or opposite side 29 of the web may be effected at a fourth station by any of the suitable procedures mentioned previously, but preferably such selective treatment is effected by a pair of electrical bombardment electrodes 51 positioned closely adjacent to the opposite surface 29 of the traveling web. A ground roll 52 or equivalent means may be employed to back up the bombardment operation, and if desired, the web may be inverted prior to the selective treatment so that the electrodes can be located above the web.

Because in the embodiment illustrated the printing and lacquered bands extend the length of the web, the electrodes 51 are aligned with such bands and operate continuously as the inked bands move therepast with the traveling web. However, if an intermittent pattern is to be applied to the web, it should be understood that the electrodes could be selectively and intermittently operated in accordance with the pattern applied to the web by the printing rolls. It also should be understood that in printing multi-color indicia on a web, more than one printing roll may be employed.

Because the surface treating, printing and lacquering operation illustrated preferably is carried out continuously, the subject method may be practiced at high speeds, determined primarily by the drying speeds of the inks and lacquer. Speeds up to 500 feet per minute are quite feasible.

While various printing inks and heat sealable lacquers may be employed with the invention, generally the inks chosen are heat resistant and known as polyamide or nitrocellulose type inks; similarly, heat sealable lacquers which have been found suitable are of the polyamide type, which may be modified with nitrocellulose or ethylcellulose if found desirable.

By way of example, an ink of the heat resistant type which has been found acceptable for the purposes described is marketed by the California Ink Company under its trade designation "Polytherm." Such inks are available in many colors, one of which, red, is identified by that company under the Number P119–06–22. Similarly, the California Ink Company markets a suitable heat sealable lacquer found well suited for this purpose which is marketed under its trade designation "Polygrip." Such a clear lacquer is identified by that company under Number 126W4–4. Other manufacturers have similar suitable inks and lacquers commercially available which may be employed if desired.

Such lacquers are heat flowable and sealable generally within the range of 200 to 250° F. and are suitable for use with low to medium density polyethylene films frequently employed as bread wraps. The invention is equally well suited for use with high density polyethylene also. Both the lacquers and inks preferably employed are solvent types which are applied to a sheet in liquid form in which the ink and lacquer particles are carried by the solvent media. Such solvent rapidly evaporates after printing leaving only the solid ink particles and lacquer particles in place.

Modifications of this invention which may become apparent to one skilled in the art are contemplated as being included herein and the invention should be interpreted in light of the appended claims.

I claim:

1. A heat sealed package comprising an article and a printed protective wrapper folded upon itself and surrounding said article and enclosing the same, said wrapper comprising a thermoplastic sheet having margins thereof overlapped and defining a seam extending along said article, one surface of said sheet being in contact with and heat sealed to the other surface of said sheet throughout substantially the full length of said seam, said sheet normally being generally non-receptive to printing inks and being treated across the full width of said one surface to make the same receptive to such inks, predetermined areas of said one ink receptive surface being coated with substantially solid pattern inked indicia, only said predetermined areas of said one surface being overcoated with a heat sealable material whereby said material contacts the other surface of said sheet in said seam, said other surface being selectively treated in said seam in alignment with said predetermined areas of said one surface to enhance the heat sealable characteristics thereof relative to said heat sealable material, whereby said sheet surfaces are heat sealable to each other for the length of said overlapped seam.

2. A thermoplastic film for wrapping articles comprising a sheet which normally is non-receptive to printing inks, one entire surface of said sheet being electrically treated to render the same receptive to printing inks, at least predetermined areas of said one surface being solidly covered with inked indicia which normally is non-heat-sealable, a layer of heat sealable lacquer only over said inked areas for rendering such areas heat sealable, the opposite surface of said sheet being selectively and locally electrically treated to enhance the heat sealable characteristics thereof relative to said lacquer, such localized treatment of said opposite surface being effected only in alignment and register with said lacquered areas whereby heat sealing of said surfaces to each other in overlapped relationship throughout the length of such overlap may be effected irrespective of the location of printed indicia areas on said one surface.

3. An article wrapping sheet comprising normally non-ink receptive polyethylene adapted to be positioned around an article with opposite surfaces overlapped and heat sealed together, one surface of said sheet being treated throughout substantially its full extent to render the same receptive to printing inks, predetermined areas of said one surface being printed with substantially solid heat resistant inked indicia which generally is non-heat sealable, a layer of heat sealable lacquer overlying said printed areas only and rendering such areas heat sealable, and predetermined treated areas on the opposite surface of said sheet enhancing the heat sealable characteristics of said opposite surface relative to said one surface lacquered and printed areas, said opposite surface treated areas being aligned with and in register with said lacquered and printed areas of said one surface, whereby said surfaces may be heat sealed to each other irrespective of the printing thereon.

4. An article wrapping sheet of substantially clear normally non-ink receptive polyethylene adapted to be positioned around an article with opposite surfaces overlapped and heat sealed together, one entire surface of said sheet being treated by electrical bombardment to render the same receptive to printing inks throughout its full extent and to enhance the heat sealing characteristics thereof relative to an untreated surface, substantially solid inked indicia on predetermined areas of said treated surface, a layer of heat sealable lacquer over each of said inked areas, the other surface of said sheet being treated by electrical bombardment in pre-selected localized areas to enhance the heat sealable characteristic of said localized areas relative to said inked and lacquered areas, said treated areas being aligned with and in register with said inked and lacquered areas, whereby said sheet may be folded on itself with said surfaces contacting each other in an overlapped seam and heat sealed together the length of such seam with the lacquered areas which are located in such seam being heat sealable to the pre-selected treated areas of said opposite surface and with the uninked and unlacquered areas of said one surface being heat sealable to the untreated areas of said opposite surface.

5. A package comprising an article and a polyethylene sheet wrapped around said article; said sheet including a heat sealed seam defined by margins of said sheet overlapped with opposite sheet surfaces in contact with each other and securely heat sealed together along the full length of said seam, said sheet normally being non-receptive to printing inks and the like, one of said surfaces being treated throughout its full extent to make the same receptive to printing inks, predetermined areas of said one surface being coated with inked indicia which is generally non-heat sealable, said indicia being covered by a layer of heat sealable material, at least part of said indicia and its covering layer of heat sealable material falling within said overlapped heat sealed seam so that such material contacts the other sheet surface, said other surface of said sheet being selectively treated to make localized areas thereof which fall within said seam and which are in contact with said heat sealable material in said seam heat sealable relative to said heat sealable material, said localized areas being aligned with and heat sealed over said indicia in said seam.

6. A method of rendering a normally non-ink-receptive thermoplastic film receptive to printing inks and of enhancing the heat sealing characteristics thereof, comprising providing a sheet of thermoplastic material, treating one surface of said sheet to make at least predetermined areas of such surface ink receptive, applying solid inked indicia to said predetermined areas of such treated surface, overcoating said predetermined areas with a heat sealable material, and selectively treating the opposite surface of said sheet in alignment and register with said predetermined areas of said one surface to enhance the heat sealable characteristics of said opposite surface relative to said predetermined areas, whereby said surfaces may be overlapped and heat sealed to each other for the length of such overlap.

7. A method of treating a thermoplastic article wrapping film to render the same ink receptive and to enhance the heat sealable characteristics thereof, comprising electrically bombarding one surface of said film to render the same ink receptive, printing predetermined areas of said one surface with solid inked indicia, overcoating only said inked areas with a layer of heat sealable lacquer, and selectively electrically bombarding the opposite surface of said film only in predetermined localized areas in alignment with said inked areas of said one surface to render such localized areas more readily heat sealable relative to said lacquer, whereby said film may be folded upon itself with said surfaces overlapping and with said respective areas aligned so that said surfaces may be heat sealed together the length of such overlap.

8. A method of forming a heat sealed bond between two surfaces at least one of which has printed indicia thereon, comprising providing a sheet of thermoplastic which normally is not readily receptive to printing inks, treating one surface of said sheet to render the same receptive to printing inks, applying inked indicia to predetermined areas of said one surface, overcoating said predetermined inked areas with a layer of heat sealable material, selectively treating the opposite surface of said sheet in alignment and register with said predetermined inked and overcoated areas of said one surface to make the same readily heat sealable relative to said heat sealable material, folding said sheet so that said surfaces overlap with the selectively treated areas of said opposite surface in contact with the heat sealable material which overcoats said inked areas and with the untreated areas of said opposite surface in contact with the areas of said one surface which are free of ink and heat sealable material, and applying heat to said sheet at such overlap to bond said surfaces together across the inked areas as well as across the areas which are free of ink.

9. A method of forming a heat sealed bond between two surfaces at least one of which has printed indicia thereon, comprising providing a sheet of polyethylene which normally is not readily receptive to printing inks, treating one entire surface of said sheet to render the same receptive to printing inks, applying inked indicia to predetermined areas of said one surface, overcoating said predetermined inked areas with a layer of heat sealable lacquer, selectively treating the opposite surface of said sheet only in alignment and register with said inked and overcoated areas of said one surface to make the same readily heat sealable relative to said heat sealable lacquer, folding said sheet so that said surfaces overlap with the selectively treated areas of said opposite surface in contact with the heat sealable lacquer which overcoats said inked areas and with the untreated areas of said opposite surface in contact with the areas of said one surface which are free of ink and heat sealable lacquer, and applying heat to said sheet at such overlap to bond said surfaces together across the inked areas as well as across the areas which are free of ink.

10. A method of rendering a thermoplastic sheet printable and heat sealable in all areas thereof, comprising providing a sheet of said thermoplastic which is normally non-receptive to printing inks, moving said sheet to a first station, electrically bombarding one surface of said sheet at said first station to render such surface receptive to printing ink, moving said sheet to a second station, applying ink in a predetermined pattern to predetermined areas of said one surface at said second station, moving said sheet to a third station, at said third station applying a layer of heat sealable lacquer only over said predetermined inked areas, moving said sheet to a fourth station, and at said fourth station electrically bombarding the opposite surface of said sheet to enhance the heat sealable characteristics thereof relative to said lacquer, such electrical bombardment being confined only to predetermined areas of said opposite surface which are in register with the predetermined inked areas of said one surface whereby when said sheet is folded upon itself the predetermined areas of said opposite surface will overlie and be heat sealable to the predetermined inked areas of said one surface so that said surfaces may be heat sealed together directly across said inked areas.

11. A printed thermoplastic resinous heat sealable wrapping sheet which normally is not receptive to printing inks, one surface of said sheet being treated throughout substantially its full extent to alter the characteristics of said one sheet surface so that the same is receptive to printing inks for the full treated area thereof, predetermined areas of said one sheet surface being printed with generally solid layers of heat resistant ink which is generally non-heat sealable, each of said predetermined printed areas of said one sheet surface being overcoated with heat sealable lacquer material which protects said printed areas during heat sealing thereover, said lacquer material being more effectively heat sealable to treated surfaces of said sheet than to untreated surfaces of said sheet, the opposite surface of said sheet being selectively treated to alter the characteristics of localized areas thereof to enhance the heat seal characteristics of such localized areas and the receptivity thereof to said lacquer material covering the printed areas of said one surface, said opposite sheet surface being selectively treated only in general alignment and register with said printed and overcoated areas of said one surface, whereby when said sheet is positioned around an article to be wrapped with said surfaces overlapping in a seam to be heat sealed said inked and overcoated areas of said one surface are in contact with said localized treated areas of said opposite surface and the remaining untreated areas of said opposite surface are in contact with the treated areas of said one surface which are free of ink and overcoating, so that said surfaces may be securely heat sealed together along the full extent of such seam.

References Cited in the file of this patent
UNITED STATES PATENTS 2,132,931     Bohn                 Oct. 11, 1938
2,968,576     Keller et al.        Jan. 17, 1961